(12) United States Patent
Davis et al.

(10) Patent No.: US 6,564,268 B1
(45) Date of Patent: May 13, 2003

(54) FIELDBUS MESSAGE QUEUING METHOD AND APPARATUS

(75) Inventors: Bruce B. Davis, Eden Prairie, MN (US); Paul D. Kammann, Golden Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 09/271,182

(22) Filed: Mar. 17, 1999

(51) Int. Cl.$^7$ .......................... G06F 13/10; G06F 13/14; G06F 13/20
(52) U.S. Cl. .............................. 710/11; 710/33; 710/69; 379/229; 700/7; 700/83
(58) Field of Search ........................... 379/229; 700/83, 700/7; 375/368; 710/11, 33, 69

(56) References Cited

U.S. PATENT DOCUMENTS

| | | | |
|---|---|---|---|
| 4,000,378 A | * 12/1976 | Caplan | 179/15 |
| 4,424,565 A | * 1/1984 | Larson | 364/200 |
| 5,442,639 A | 8/1995 | Crowder et al. | 371/20.1 |
| 5,499,344 A | 3/1996 | Elnashar et al. | 395/250 |
| 5,870,444 A | * 2/1999 | Mynett et al. | 375/368 |
| 6,018,577 A | * 1/2000 | Roach, Jr. | 379/229 |
| 6,141,596 A | * 10/2000 | Gretta et al. | 700/83 |
| 6,151,640 A | * 11/2000 | Buda et al. | 710/11 |

FOREIGN PATENT DOCUMENTS

| | | |
|---|---|---|
| DE | 41 33 636 A1 | 4/1993 |
| GB | 2 310 246 A | 8/1997 |
| JP | 06 242889 A | 11/1994 |

OTHER PUBLICATIONS

"FB3050 Fieldbus Communication Controller; Data Sheets and Application Notes", Smar Research Corporation, May 1997, pp. 1–48.
"Fieldbus Interface Controller; Frontier–1, Revision 2.2 Data Sheet", Fuji Electric Co., Ltd., Jul. 20, 1995, pp. 1–59.
"Fieldbus Interface Controller IC; Frontier–1+", Fuji Electric Co., Ltd., Sep., 1998, pp. 1–83.
"FB 2050 Fieldbus Communications Controller", Smar Research Corporation, 1996, pp. 1–18.
"Yamaha LSI YTZ420 Application Manual", Yamaha Corporation, Catalog. No. LSI–6TZ420A0, 1995, pp. 1–70.
"FB 2050 Application Notes; General Purpose Microcontroller Interface", Smar Research Corporation, 1996, pp. 1–19.

* cited by examiner

*Primary Examiner*—Jeffrey Gaffin
*Assistant Examiner*—Rehana Perveen
(74) *Attorney, Agent, or Firm*—Westman, Champlin & Kelly, P.A.

(57) ABSTRACT

A method and apparatus are provided to allow at least portions of two fieldbus messages to be stored in a fieldbus device. The fieldbus device includes a media access unit, a fieldbus communication controller, and a controller. The media access unit is coupleable to a fieldbus loop to receive fieldbus signals and provide a digital bitstream related to the fieldbus signals. The fieldbus communication controller assembles data segments relating to at least portions of two fieldbus messages from the bitstream and stores the segments in a receive FIFO memory. The controller is adapted to read the segments from the receive FIFO memory and act upon fieldbus messages.

27 Claims, 7 Drawing Sheets

FIELDBUS MESSAGE QUEUING METHOD AND APPARATUS

BACKGROUND OF THE INVENTION

The process industry uses a variety of devices to monitor and control industrial processes. Such devices include process variable transmitters, process actuators, process alarm devices, and process control modules.

Process variable transmitters are used to monitor process variables associated with industrial processes. Such variables include pressure, temperature, flow, level, pH, turbidity, density, concentration, chemical composition and other properties. Process actuators are used to control valves, pumps, heaters, agitators, solenoids, vents, and other such devices. Process alarm devices are used to remotely monitor a specific process variable provided by a process variable transmitter, among other things, and provide an alarm if the process variable deviates unacceptably from the process norm. Process control modules receive information related to the process from process variable transmitters, perform analyses upon the received process information and initiate corrective action through process actuators. Generally, a process control module is located in a control room to facilitate user interaction.

Due to the volatile nature of the process field environment, process devices should not generate a spark that could couple to and ignite explosive atmospheres and flammable material. Process devices generally satisfy this design criteria by either having explosion-proof housings as specified in NEC Sections 500–503, dated 1996, or by having intrinsically safe circuits. When a process device is intrinsically safe, it operates on such low power levels that it is generally not able to generate a spark with enough energy to cause ignition even under fault conditions. This design criteria is further complicated by the fact that additional external power sources are often not available to power a process device in the field. Thus, the process device must rely upon power supplied from the process loop itself while being either explosion-proof or intrinsically safe. Low power process devices are able to meet intrinsic safety criteria while still operating solely upon power received from a process control loop.

In the process industry, rapid and reliable communication between the process devices is very important. In the past, such communication involved a process variable transmitter controlling the amount of current flowing through a process control loop based upon a process variable. Current was supplied from a current source in the control room and the process variable transmitter controlled the amount of current from its location in the field. For example, a 4 milliamp (mA) signal could be used to indicate a zero reading while a 20 mA could be used to indicate a full-scale reading. As technology progresses, there is an ever-increasing demand to provide more and more information about the process and the process devices themselves.

Foundation™ Fieldbus and Profibus-PA (referred to collectively as fieldbus) are multi-drop serial digital communications protocols intended for connecting field instruments and other process devices such as monitoring and simulation units in process control systems. The physical layer of the fieldbus protocols are defined by Instrument Society of America standard ISA-S50.02-1992, and its draft 2 extension dated 1995; or IEC 1158-2 dated 1993. Fieldbus allows enhanced digital communication over previous process control loop methods while maintaining the ability to power process devices coupled to the fieldbus loop and while meeting intrinsic safety requirements.

The introduction of fieldbus initially provided a digital process loop capable of allowing communication at 31,250 bits/second. Later, revisions of fieldbus allow 1 megabit/second and 2.5 megabits/second rates of digital serial communication. Other communications rates are also contemplated.

Fieldbus now provides significant capabilities for digitally communicating immense amounts of process data. Thus, there is a continuing need to develop process devices capable of maximizing fieldbus communication effectiveness while minimizing power consumption, cost, and device size.

SUMMARY OF THE INVENTION

A method and apparatus are provided to allow at least portions of two fieldbus messages to be stored in a fieldbus device. The fieldbus device includes a media access unit, a fieldbus communication controller, and a controller. The media access unit is coupleable to a fieldbus loop to receive fieldbus signals and provide a digital bitstream related to the fieldbus signals. The fieldbus communication controller assembles data segments relating to at least portions of two fieldbus messages from the bitstream and stores the segments in a receive FIFO memory. The controller is adapted to read the segments from the receive FIFO memory and act upon fieldbus messages.

DETAILED DESCRIPTION OF THE PREFERRED EMBODIMENTS

Although the present invention will be described with reference to preferred fieldbus embodiments, workers skilled in the art will recognize that changes may be made in form and detail without departing from the spirit and scope of the invention, which is defined by the appended claims.

Figure 1:
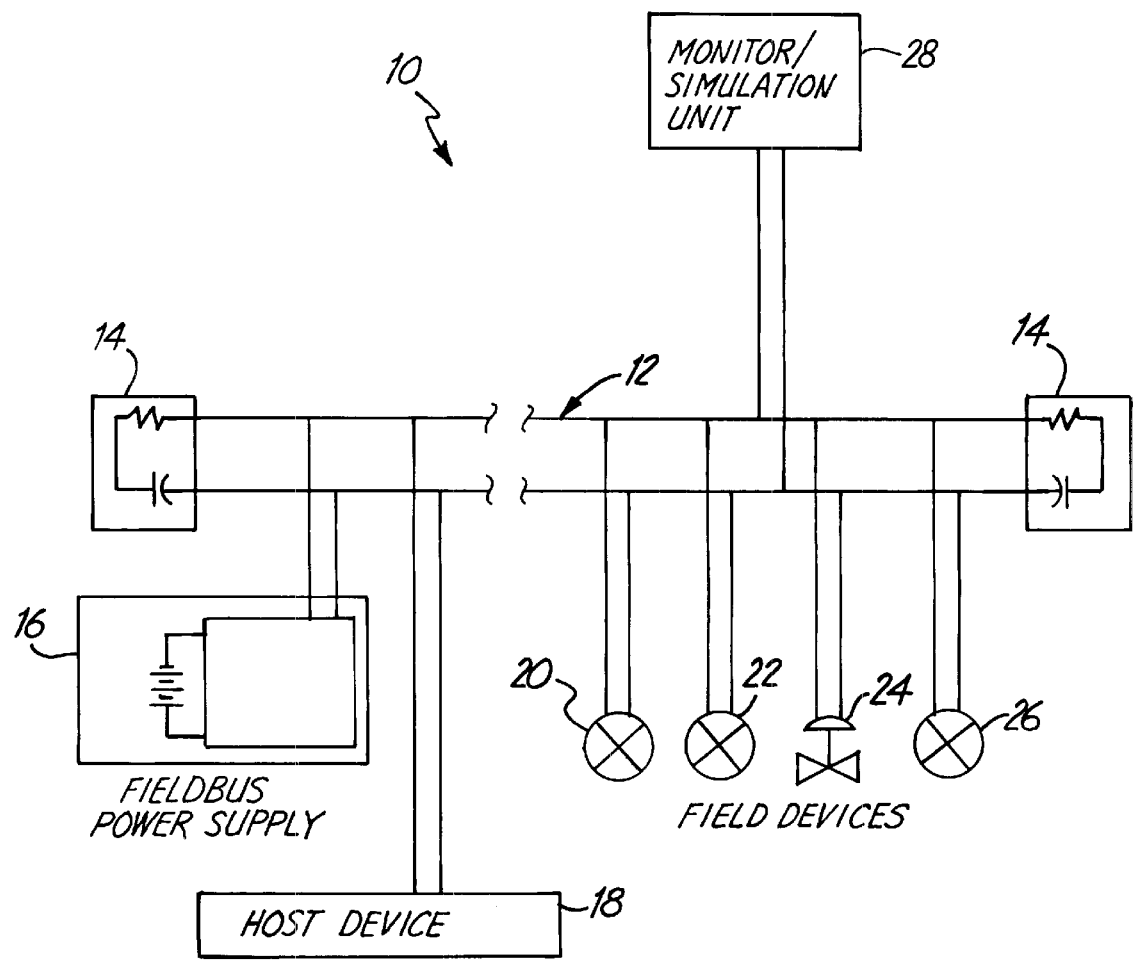
FIG. 1 is a block diagram of a fieldbus process control system illustrating the environment of the invention.

FIG. 1 is a block diagram of fieldbus process control system 10 illustrating a process measurement/control environment. System 10 includes fieldbus loop 12, loop terminations 14, fieldbus power supply 16, and fieldbus devices 18, 20, 22, 24, 26 and 28.

System 10 is wired in a spur implementation, however a variety of other wiring implementations are possible. Fieldbus terminations 14 terminate opposite ends of fieldbus loop 12. Each of fieldbus terminations 14 is modeled as a capacitor in series with a resistor. Generally, the capacitor has a capacitance of about 1 microfarad and the resistor has a resistance of about 100 ohms. Fieldbus power supply 16 is also coupled to fieldbus loop 12 to provide power to fieldbus devices 18, 20, 22, 24, 26, 28 coupled to fieldbus loop 12. Generally, fieldbus devices require a voltage between 9 and 35 volts DC which is supplied by fieldbus power supply 16 over fieldbus loop 12.

A fieldbus device is a process device that is adapted through hardware, software, or a combination of the two, for communication in accordance with the fieldbus protocols defined above. Process devices 18, 20, 22, 24, 26 and 28 are but a few examples of fieldbus devices. For example, fieldbus device 18 is a host device operating as a fieldbus process control module providing control functions to the process. Fieldbus devices 20 and 22 are, for example, process variable transmitters, which provide process information related to process variables. Fieldbus device 24 is a process actuator which closes a valve or performs some other actuation function upon receiving a fieldbus message from fieldbus loop 12. Fieldbus device 26 is a process alarm which monitors process variable information from fieldbus devices 20 and 22 and provides an alarm if the process variable information from fieldbus devices 20 and 22 deviates unacceptably from a process norm. Fieldbus device 28 is a diagnostic unit such as a fieldbus monitor and simulation unit with a user interface for troubleshooting.

Fieldbus loop 12 is a media configuration including two or more conductors which are suitable for passing signals in accordance with the physical layer specifications defined above. Thus, fieldbus loop 12 can be a low speed fieldbus, high speed fieldbus, or any other fieldbus implementation devised which conforms to the protocols cited above.

Figure 2:
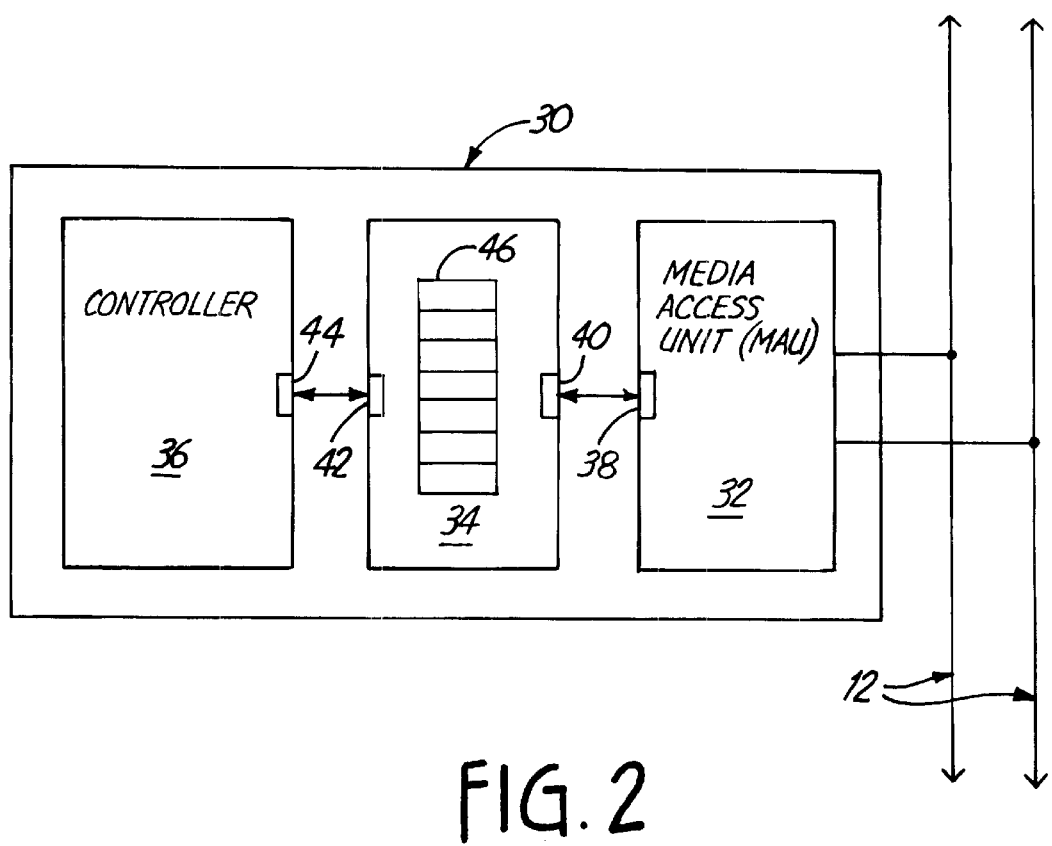
FIG. 2 is a block diagram of a fieldbus device in accordance with an embodiment of the invention.

FIG. 2 is a system block diagram of fieldbus device 30 shown coupled to fieldbus loop 12 having a media access unit 32, fieldbus communication controller 34, and controller 36. While media access unit 32, fieldbus communication controller 34, and controller 36 will generally be described as separate, such description is intended to enhance clarity, and it is contemplated that such components could be provided on a single application specific integrated circuit.

Media access unit 32 is adapted to couple to fieldbus loop 12 to transmit and receive analog signals representative of fieldbus messages or frames. During reception, media access unit 32 converts the received analog signals into digital signals that generally include serially encoded Manchester data. Media access unit 32 includes a serial output interface 38, which bi-directionally provides the digital data at a first rate of transmission. For example, low speed fieldbus provides for data transmission at a rate of 31,250 bits/second. Thus, if media access unit 32 is adapted to function with a low speed fieldbus, then the first rate of transmission is about 31,250 bits/seconds.

Fieldbus communication controller 34 can be an application specific integrated circuit, and includes a serial input interface 40 coupled to the serial output interface 38 of media access unit 32. Fieldbus communication controller 34 also includes a data output 42 which provides data at a second rate of transmission which is faster than the first rate of transmission provided by media access unit 32. Fieidbus communication controller 34 also includes a fieldbus receive first-in-first-out (FIFO) memory 46 which can store fieldbus data and facilitate speed matching of the two data transmission rates. Fieldbus receive FIFO memory 46 is a memory arrangement in fieldbus communication controller 34 that is adapted to store data segments in the order in which they were received.

Controller 36 includes a data input interface 44 coupled to data output interface 42 of fieldbus communication controller 34. Data input interface is adapted to communicate with data output interface 42, and as such can be a parallel or serial interface. Controller 36 can be a microprocessor or a direct memory access controller, and can provide any of a wide variety of control functions, or controller 36 can merely log fieldbus data from fieldbus loop 12. The data can be process data or diagnostic data related to the operation of the fieldbus protocol itself.

During reception of fieldbus data, media access unit 32 receives Manchester encoded data in fieldbus format from fieldbus loop 12 and converts it into Manchester encoded digital data at logic levels which data is provided to fieldbus communication controller 34 through ports 38, 40. Fieldbus communication controller 34 receives the Manchester encoded serial bitstream and decodes the bitstream while assembling the bits into data segments. A data segment is any grouping of two or more bits. For example a data segment can be a nibble, octet, byte, word or any other grouping. The data segments are stored in receive FIFO memory 46 to be read by controller 36. The fieldbus message, or frame, includes a preamble, start delimiter, fieldbus data segment(s), frame check sequence (FCS) segments and an end delimiter, each of which may comprise one or more data segments. Each stored fieldbus data segment can be read by controller 36 to operate upon the fieldbus message. Optionally, the FCS segments can be read by controller 36 for data integrity purposes.

One feature of embodiments of the invention includes the adaptation of fieldbus communication controller 34 to allow at least portions of two fieldbus messages to co-exist in fieldbus receive FIFO memory 46 without generating an error and losing any portion of either fieldbus message. In the past, it was necessary for a controller to completely read the data segments corresponding to a given fieldbus message from the fieldbus receive FIFO memory before a start delimiter from a second message was received from the fieldbus loop. If a start delimiter from a second fieldbus message was received before all data segments corresponding to the first message had been removed from the fieldbus receive FIFO memory, then an error was generated and both fieldbus messages were lost because there was no way to track the boundary between portions of multiple fieldbus messages. To help remedy this problem, the fieldbus communication controller would be configured to provide an interrupt signal to the controller when a pre-selected number of data segments were present in the fieldbus receive FIFO memory. Upon receiving the interrupt request from the fieldbus communication controller, it was important for the controller to act very quickly to read the fieldbus data segments from the fieldbus receive FIFO memory or risk the arrival of a new start delimiter and the associated error. Such results were highly undesirable in the process industry as accurate, real-time, process information is a virtual necessity.

Figure 3:
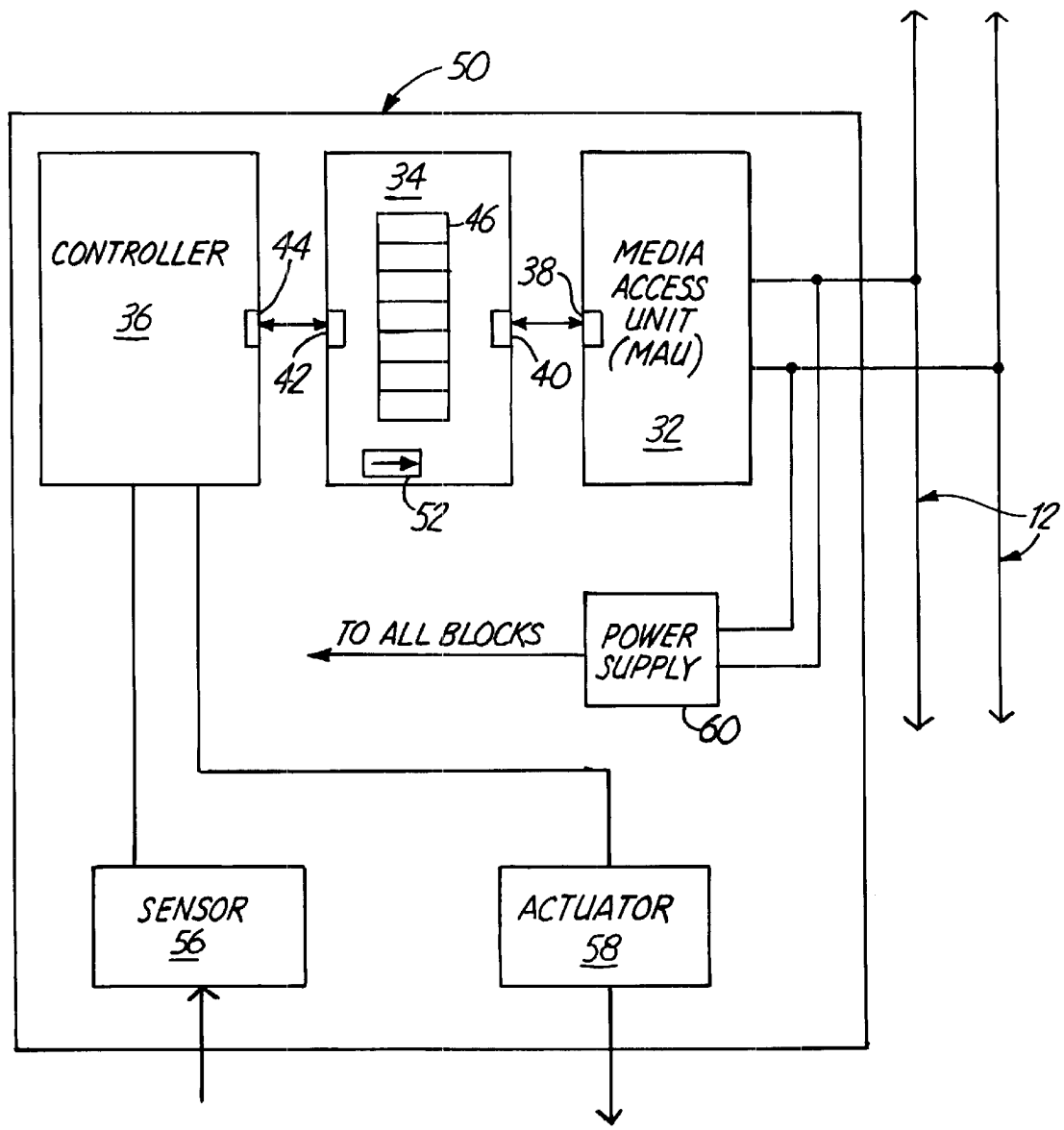
FIG. 3 is a block diagram of another fieldbus device in accordance with another embodiment of the invention.

FIG. 3 is a system block diagram of fieldbus device 50 implemented in accordance with an embodiment of the invention similar to that shown in FIG. 2. Fieldbus device 50 bears many similarities to fieldbus device 30 shown in FIG. 2 and like elements are numbered similarly. Fieldbus device 50 includes media access unit 32 which is coupled to fieldbus loop 12 to provide serial fieldbus data to fieldbus communication controller 34. In the embodiment shown in FIG. 3, fieldbus communication controller 34 includes an end_ptr pointer 52 which is adapted to indicate a segment location of a beginning segment of a portion of a second fieldbus message or frame.

As shown in FIG. 3, controller 36 can be coupled to a sensor 56 or actuator 58 to monitor or control a process. For example, sensor 56 can be a pressure sensor, temperature sensor, or any other suitable sensor. Actuator 58 can be an electric solenoid, pneumatic valve, or any other suitable actuator.

Fieldbus device 50 also includes power supply 60. Power supply 60 is coupleable to fieldbus loop 12 to receive power from fieldbus loop 12 and is coupled to media access unit 32, fieldbus communication controller 34, controller 36, sensor 56, and actuator 58 to provide power to those components. In this manner, fieldbus device 50 can be adapted to be powered completely from power received from fieldbus loop 12.

Figure 4:
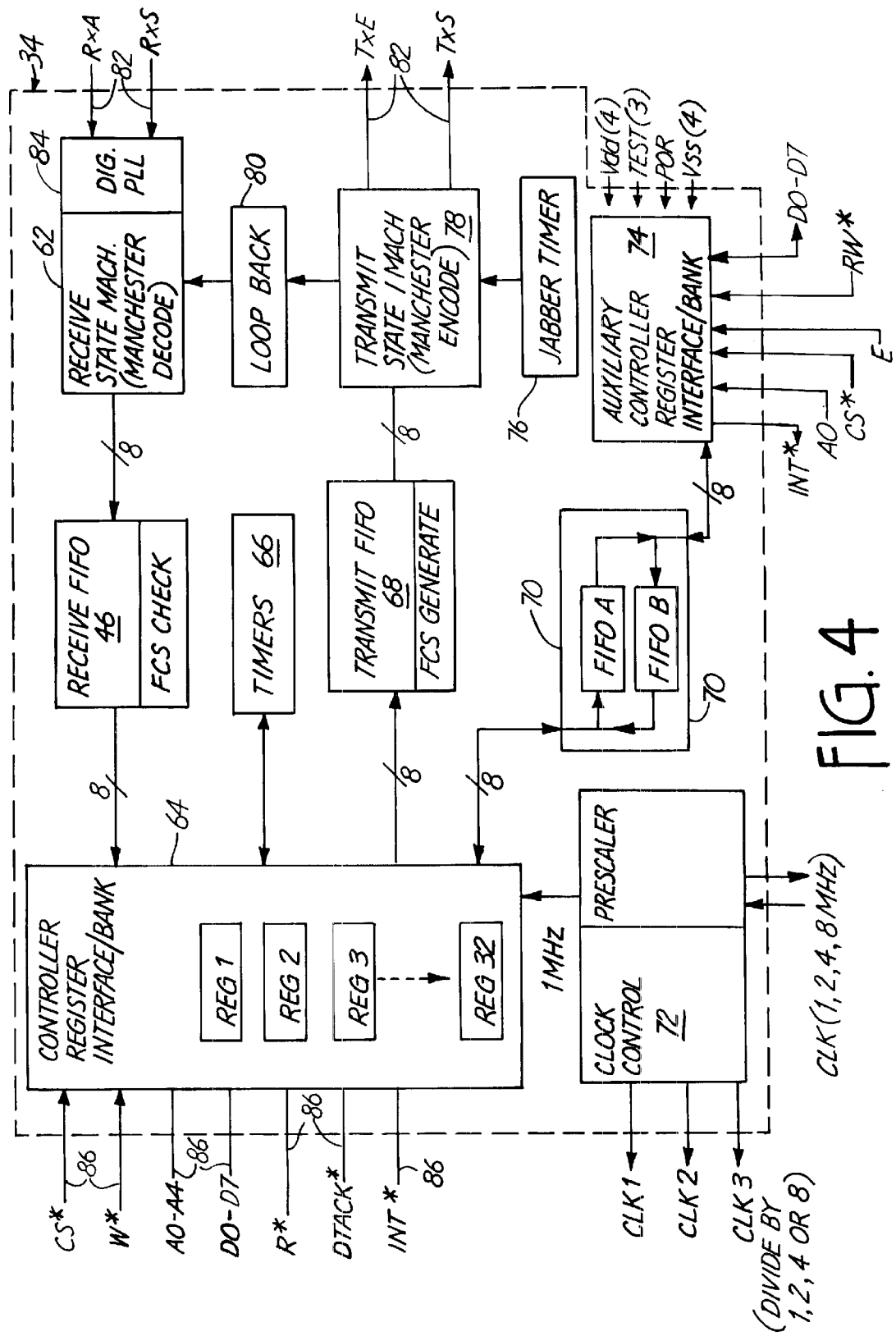
FIG. 4 is a block diagram of the fieldbus communication controller of FIGS. 2 and 3 in accordance with an embodiment of the present invention.

FIG. 4 is a system block diagram of fieldbus communication controller 34. Fieldbus communication controller 34 includes receive state machine 62, receive FIFO memory 46, controller register interface/bank 64, timers 66, transmit FIFO memory 68, dual FIFO interface 70, clock control 72, auxiliary register interface/bank 74, jabber timer 76, transmit state machine 78, and loop back module 80.

Lines 82 comprise a low speed serial interface, which is coupleable to a media access unit, such as media access unit 32 shown in FIGS. 2 and 3. Receive lines RxA and RxS are coupled to a digital phase lock loop (PLL) module 84 in receive state machine 62. Phase lock loop module 84 allows receive 30 state machine 62 to synchronize to a preamble field and decode Mahchester encoded data when line RxA becomes active. Once the preamble has been detected, receive state machine 62 waits for the start delimiter pattern. If receive state machine 62 detects that the start delimiter has inverted polarity, it corrects the polarity of data. The start delimiter determines the segment boundary within the bit stream. After the start delimiter has been detected by receive state machine 62, the serial bitstream is converted into data segments by receive state machine 62 which segments are then written into receive FIFO memory 46. Receive state machine 62 continues to place new data segments into receive FIFO memory 46 until it detects an end delimiter. Once the end delimiter has been detected and the FCS segments verified, receive state machine 62 waits for the RxA line to go inactive. When the RxA line is inactive, receive state machine 62 returns to its initial state waiting for the next active RxA signal.

Receive FIFO memory 46 accepts the data segments from receive state machine 62 and allows a controller such as controller 36 (shown in FIGS. 2 and 3) to access the stored data segments through controller register interface/bank 64. Controller register interface/bank 64 includes a plurality of lines 86 which comprise a data output which provides data at a second rate of transmission. The second rate of transmission is faster than the rate provided by low speed serial interface 82. Lines 86 can comprise a parallel interface, or a serial interface as long as the rate of data transmission is faster than that of interface 82.

Transmit FIFO memory 68 is coupled to controller register interface bank 64 and transmit state machine 78. Transmit FIFO memory 68 and transmit state machine 78 are used to transmit fieldbus information over fieldbus loop 12. Dual FIFO interface 70 is coupled to controller register interface/bank 64 as well as auxiliary controller interface/bank 74. Dual FIFO interface 70 and auxiliary controller interface/bank 74 are used to interface to an optional second controller (not shown) which may provide additional functions such as sensor linearization or the like. Clock control 72 is provided by fieldbus communication controller 34 to maintain proper signal timing.

Figure 5A:
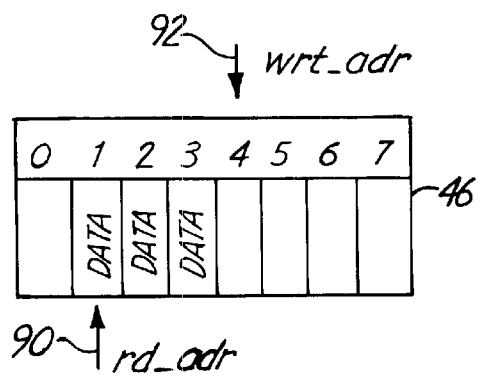
FIGS. 5A–5C are diagrammatic views of a fieldbus receive first-in-first-out (FIFO) memory of the fieldbus communication controller of FIG. 4.

FIG. 5A is a diagrammatic view of a fieldbus receive FIFO memory 46 with associated rd_adr pointer 90 and wrt_adr pointer 92. Pointers 90 and 92 can be embodied in any memory which can store data indicative of fieldbus data segment locations in receive FIFO memory 46. For illustration purposes, receive FIFO memory 46 is shown with 8 fieldbus data segment locations. Preferably receive FIFO memory 46 includes 32 such segment locations, but any number of segments is contemplated. Pointers 90, 92 are wrap-around pointers such that once a pointer is incremented past data segment location 7, the pointer will indicate data segment location 0. Pointers 90, 92 can be three bit counters in the above example, however if more than 8 segment locations are provided by receive FIFO memory 46, then pointers 90, 92 will include an appropriate number of bits. In operation, pointer 92 is incremented as each new data segment is stored in receive FIFO memory 46. Thus, pointer 92 will indicate the next available segment location into which a received fieldbus data segment can be stored. Pointer 90 indicates the current location of the next fieldbus data segment to be read from receive FIFO memory 46 by a controller such as controller 36 (shown in FIGS. 2 and 3). Such a controller would generally read the data segment indicated by pointer 90 from receive FIFO memory 46; increment pointer 90 to the next data segment; check whether receive FIFO memory 46 was been emptied as a result of the previous read operation; and continually repeat the process until receive FIFO memory 46 is empty. Thus, for each data segment read from fieldbus receive FIFO memory 46, the controller generally checks after each segment read operation to see whether fieldbus receive FIFO memory 46 was emptied as a result of a previous read operation. Other types of FIFO memory structures can be used in accordance with the invention. For example, FIFO memory 46 can be formed using. a linked list data structure such that data pointers can be updated to effect the FIFO memory.

Figure 5B:
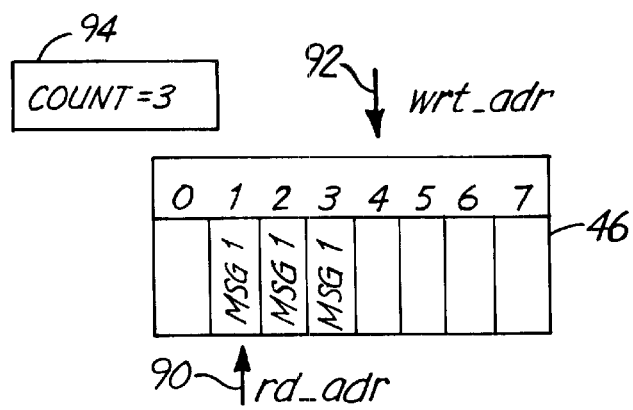

FIG. 5B is a diagrammatic view of fieldbus receive FIFO memory 46, associated rd_adr pointer 90, wrt_adr pointer 92, and fieldbus receive FIFO counter 94. Counter 94 is a four bit up/down counter adapted to keep count of the total number of fieldbus data segments stored in receive FIFO 46. However, if more than 8 segment locations are provided by receive FIFO memory 46, counter 94 will include the appropriate number of bits. Counter 94 increments with each write, decrements with each read, and maintains the same count if both read and write occur on the same clock cycle. Pointers 90 and 92 function as described with respect to FIG. 5A. Fieldbus data segments corresponding to a fieldbus message (Msg1) are stored in receive FIFO locations 1–3. Thus, fieldbus receive FIFO counter 94 stores a value of 3. By providing a count of the total number of data segments present in receive FIFO memory 46, a controller such as controller 36 can iteratively "burst read" a number of fieldbus data segments beginning at the segment indicated by rd_adr pointer 90.

Figure 5C:
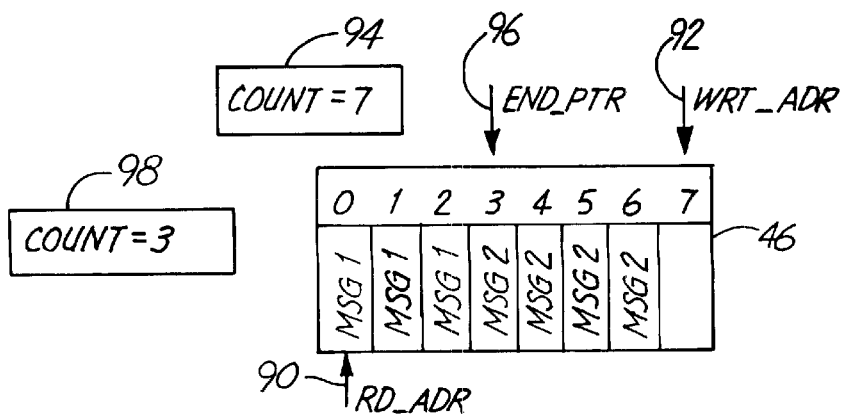

FIG. 5C is a diagrammatic view of receive FIFO memory 46, rd_adr pointer 90, wrt_adr pointer 92, counter 94, end_ptr pointer 96, and message segment counter 98. Pointers 90, 92 and counter 94 operate as described above with respect to FIG. 5B. End_ptr pointer 96 can be considered a place holder and points to the first data segment of a portion of a second fieldbus message. Pointer 96 is set to wrt_adr pointer 92 when Rcv_end occurs and queue_empty is false (indicating the end of the first fieldbus message). Message segment counter 98 is provided for controller 36 to read at any time, and indicates a valid segment count for the first fieldbus message (Msg1) stored in fieldbus receive FIFO memory 46 even if data segments for a second fieldbus message (Msg2) are also stored in fieldbus receive FIFO memory 46. The addition of message segment counter 98 allows a controller such as controller 36 to burst read all fieldbus message segments corresponding to fieldbus message Msg1.

The following data structures facilitate the storage of at least portions of two fieldbus messages in fieldbus receive FIFO memory 46. Such data structures are generally stored in controller register interface/bank 64 (shown in FIG. 4).

Queue_empty can be a flag which is set true if counter 94 equals 0. A flag is a Boolean data structure having only two states, on or off. These states can also be referred to as true or false, and one or zero.

Queue_full can be a flag which is set true if counter 94 equals the total number of segment locations provided by receive FIFO memory 46 (i.e. 8 in FIGS. 5A–5C).

Rcv_end can be a pulse indicating that a fieldbus message has been received. This is an interrupt bit for the controller, and is set after an end delimiter is verified.

Last_Segment_Read is a pulse indicating that the last segment of a first fieldbus message has just been read from fieldbus receive FIFO memory 46. This is set when end_ptr_valid is true, queue_full is false, and rd_adr pointer 90 equals end_ptr 96.

End_ptr_valid is a signal that indicates when data from two fieldbus messages are currently stored in fieldbus receive FIFO memory 46. This signal is used to qualify when the end_ptr setting is valid. End_ptr_valid is set true when Rcv_end occurs and queue_empty is false. This signal is cleared to false on reset, or if last_segment_read occurs, or if queue_empty is true, or if Msg_Err is active.

Msg_Err can be an error interrupt flag that indicates that a second fieldbus message has been completely received before the first fieldbus message was completely emptied from fieldbus receive FIFO memory 46. Msg_Err is set if End_ptr_valid is set and Rcv_end occurs.

Msg_End can be a status interrupt flag for controller 36. This flag indicates that the last bit of the first fieldbus message has been read, and the beginning of the second fieldbus message is already stored in fieldbus receive FIFO memory 46. Msg_End is set true when Last_segment_read occurs and queue_empty is false.

Figure 6:
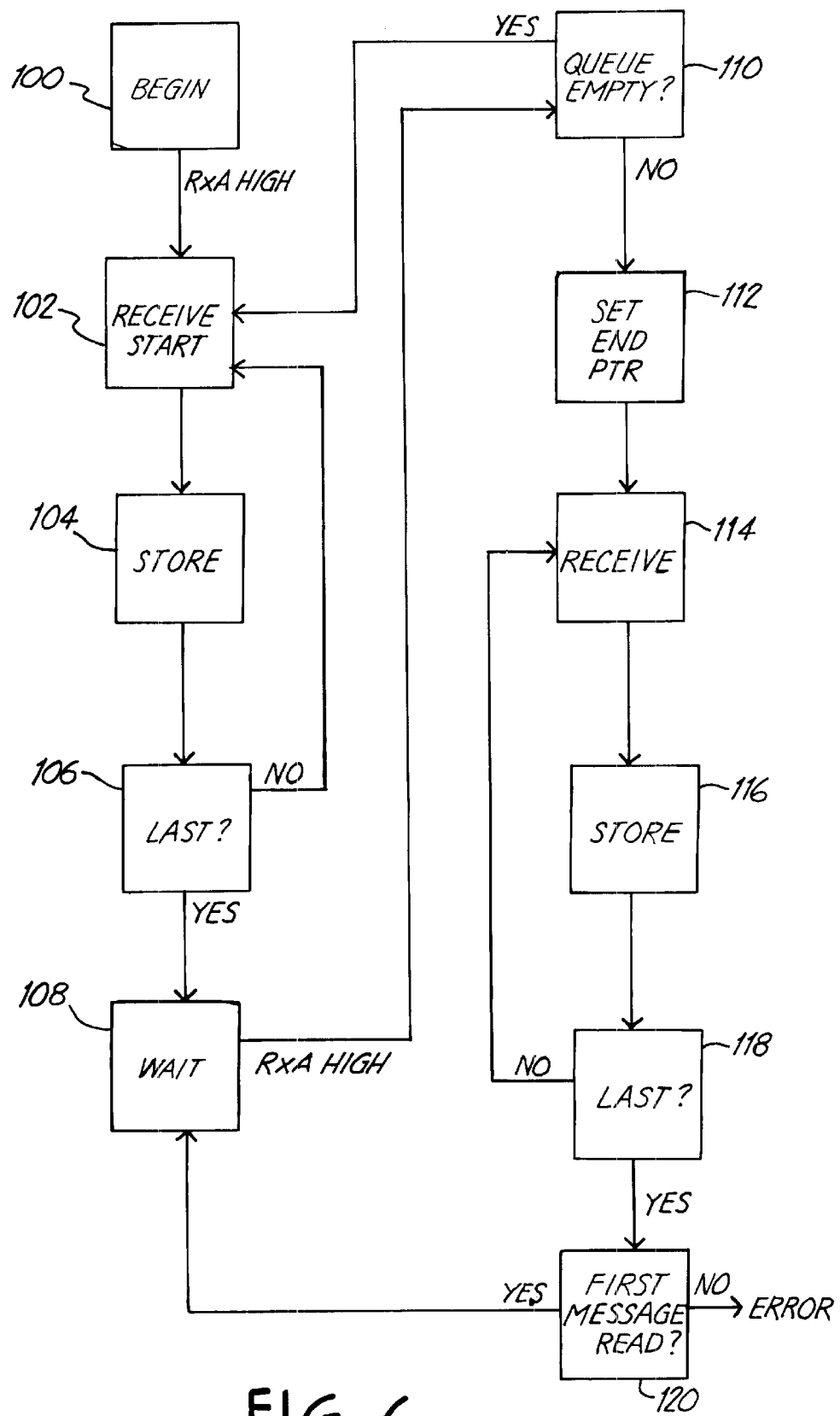
FIG. 6 is a block diagram illustrating a method of storing received fieldbus segments in accordance with an embodiment of the invention.

FIG. 6 is a block diagram illustrating steps performed for a method of storing portions of at least two fieldbus messages in accordance with an embodiment of the invention. It should be noted that segments may be read from the receive FIFO memory at any step during the following method.

The method begins at block 100 when the variables are initialized to pre-selected initial conditions. Control passes to block 102 when the RxA line goes high. At block 102, a fieldbus communication controller receives a fieldbus data segment. Upon receiving the fieldbus data segment, control passes to block 104 where the received segment is stored in receive FIFO memory at a segment location indicated by a wrt_adr pointer (such as pointer 92); a total FIFO receive counter (such as counter 94) is incremented; a segment counter (such as counter 98) is incremented; and a wrt_adr pointer is incremented. Control then passes to block 106 which checks whether the received segment was followed by an end delimiter indicating that the segment is a last segment for a fieldbus message. If the received fieldbus segment is not the last segment, then control passes back to block 102 which begins receiving another segment. If, during block 106, the fieldbus communication controller recognizes that the received segment is the last segment of a fieldbus message, then controls passes to block 108 which waits the RxA line goes high, at which time control passes to block 110.

At block 110, a controller such as fieldbus communication controller 34 checks to see if the receive FIFO memory is empty as indicated by the label (Queue Empty?). If the receive FIFO memory is empty, then control is passed back to block 102 which begins accumulating the fieldbus message as a first message. This is because no other fieldbus message portions are present in the receive FIFO memory. If controller 34 recognizes that the. receive FIFO memory is not empty, then control passes to block 112, because it is necessary to set a pointer indicating a boundary between the two fieldbus message portions. At block 112 an End_ptr pointer such as pointer 96 is set to the current value of the wrt_adr pointer. After the End_ptr has been set, control passes to block 114. At block 114 a fieldbus segment is received after which control passes to block 116.

At block 116, the received segment is stored in the receive FIFO memory; the wrt_adr pointer is incremented; and the total FIFO receive counter is incremented. Control then passes to block 118 which functions the same as block 106 to check whether the received segment is the last segment for the second fieldbus message. If the received segment is not the last segment, then control passes back to block 114 to receive another segment.

If controller 34, during block 118, recognizes that the received segment is a last segment, then control passes to block 120. At block 120, the controller checks to see whether the first fieldbus message has been read (and thus removed) from the receive FIFO memory. If the first fieldbus message has been read from the receive FIFO memory, then control returns to block 108 to wait for another start delimiter. However, if the first message has not been read from the receive FIFO memory then an error is set as there are no additional resources available to track yet another fieldbus message boundary. Those skilled in the art will recognize that the above method can be performed by a computer or other processor programmed with a computer program stored on a computer readable medium.

Figure 7:
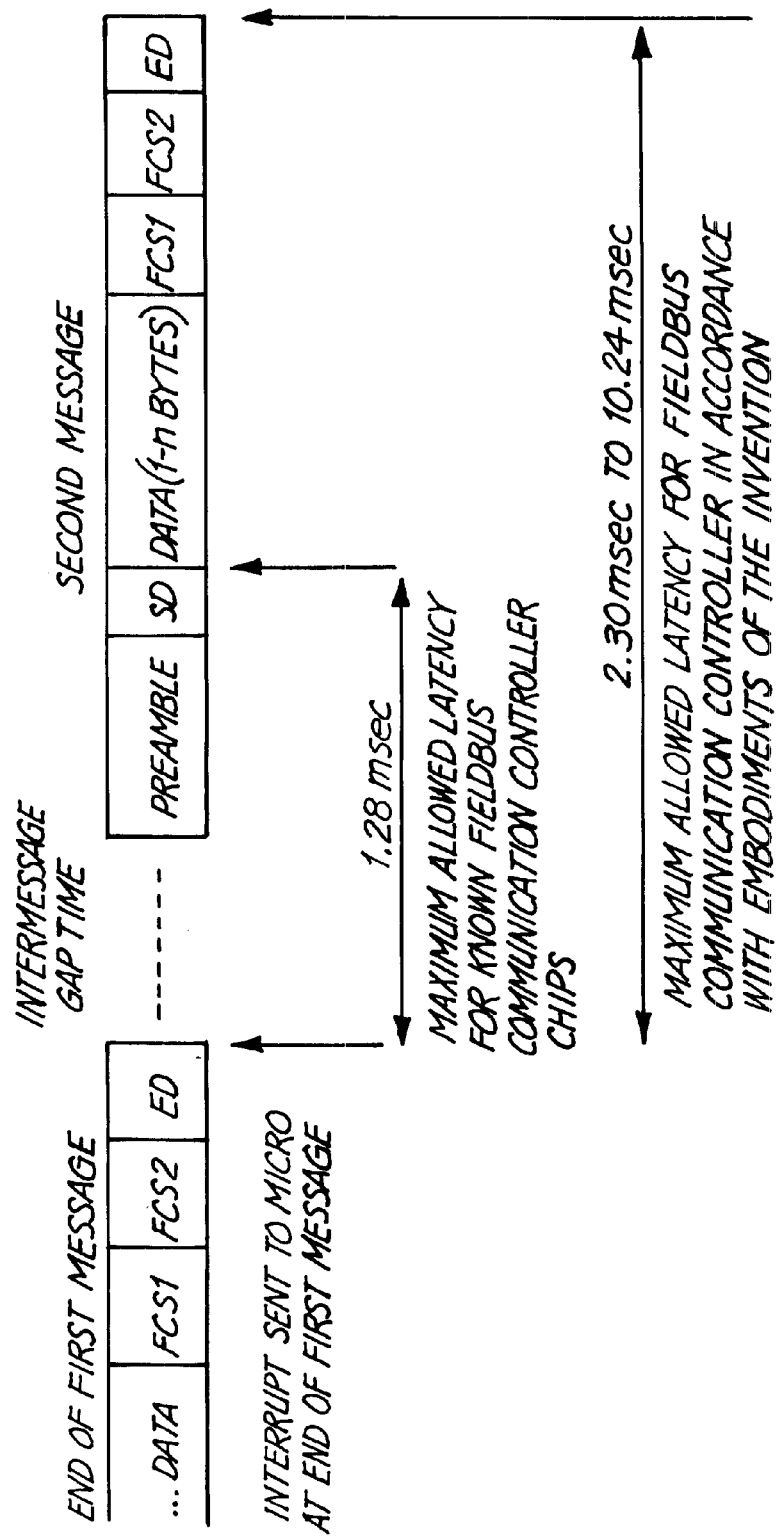
FIG. 7 is a timing diagram illustrating fieldbus message timing.

FIG. 7 is a timing diagram of first and second fieldbus messages. The times shown in FIG. 7 correspond to a low speed fieldbus providing a data transmission rate of 31,250 bits/second. For the purposes of illustration, it can be assumed that each fieldbus segment includes eight bits such that a given segment can be received in 256 microseconds. The segments marked FCS correspond to checksums used to ensure data integrity. The segments marked SD indicate start delimiters while the segments marked ED indicate end delimiters. Finally, the number of segments of intermessage gap and preamble are programmable, although the duration of each is generally two segment periods. Thus, a controller operating in conjunction with a known fieldbus communication controller must respond to a fieldbus communication controller interrupt within the period of 5 data segments or 1.28 milliseconds in the above scenario or risk losing the fieldbus message. In contrast, a controller operating in conjunction with a fieldbus communication controller in accordance with embodiments of the invention need only respond to a fieldbus communication controller interrupt within a minimum period of nine data segments or 2.30 milliseconds. This provides a significant reduction of processor overhead especially for a high-traffic fieldbus loop. The advantages of the invention become even more important when fieldbus transmission speeds increase faster than controller speeds.

What is claimed is:

1. A fieldbus device, comprising:
    a media access unit, adapted to couple to a fieldbus loop and receive signals representative of fieldbus messages, and having a serial output interface;
    a fieldbus communication controller having a serial input interface coupled to the serial output interface of the media access unit, and having a data output;
    a controller having a data input interface coupled to the data output interface of the fieldbus communication controller; and
    wherein the fieldbus communication controller includes a receive first-in-first-out (FIFO) memory and is adapted to simultaneously store at least portions of two fieldbus messages.

2. The fieldbus device of claim 1, wherein the data input interface of the controller is a parallel interface.

3. The fieldbus device of claim 1, wherein the controller is a direct memory access controller.

4. The fieldbus device of claim 1, wherein the fieldbus communication controller is an application specific integrated circuit.

5. The fieldbus device of claim 1, wherein the controller is a microprocessor.

6. The fieldbus device of claim 1, wherein the fieldbus communication controller includes a first pointer adapted to indicate an address of one of the at least portions of two fieldbus messages and a second pointer adapted to indicate a starting address of another of the at least two portions of fieldbus messages.

7. The fieldbus device of claim 1, and further comprising a sensor coupled to the controller and coupleable to a process, the sensor adapted to provide a sensor output to the controller based upon a process variable.

8. The fieldbus device of claim 1, and further comprising an actuator coupled to the controller and adapted to couple to a process to affect the process.

9. The fieldbus device of claim 1, wherein the serial output interface of the media access unit is adapted to provide data at a first rate of transmission, the data output of the fieldbus communication controller is adapted to provide data at a second rate of transmission which is faster than the first rate of transmission.

10. The fieldbus device of claim 9, wherein the first rate of transmission is less than about 1 megabit/second.

11. The fieldbus device of claim 10, wherein the first rate of transmission is about 31,250 bits/second.

12. The fieldbus device of claim 1 and further comprising a power supply coupleable to the fieldbus loop adapted to power the fieldbus device with power received from the fieldbus loop.

13. The fieldbus device of claim 1, wherein the fieldbus-.loop comprises a two-wire loop.

14. The fieldbus device of claim 1, wherein the fieldbus loop comprises more than two conductors.

15. An application specific integrated circuit for storing at least portions of first and second fieldbus messages, the circuit comprising:
    a serial input interface adapted to receive serial fieldbus data at a first transmission rate;
    a data output adapted to provide fieldbus data at a second rate of transmission which is faster than the first rate of transmission;
    a receive first-in-first-out (FIFO) memory coupled to the serial input interface and the data output and adapted to store a plurality of fieldbus data segments;
    a first pointer adapted to indicate a segment location corresponding to a current receive first-in-first-out read location;
    a second pointer adapted to indicate a segment location corresponding to a current receive first-in-first-out write location; and
    a third pointer adapted to indicate a segment location corresponding to a first segment of a portion of the second fieldbus message.

16. The circuit of claim 15, and further comprising a counter adapted to maintain a count of a total number of fieldbus data segments stored in the receive first-in-first-out.

17. The circuit of claim 16 and further comprising:
    a first flag adapted to indicate whether the receive first-in-first-out (FIFO) memory is empty;
    a second flag adapted to indicate whether the receive first-in-first-out (FIFO) memory is full; and
    a third flag adapted to indicate whether the circuit has received a fieldbus message.

18. The circuit of claim 17, and further comprising a fourth flag adapted to indicate whether an end segment of the first fieldbus message has been read from the receive first-in-first-out (FIFO) memory.

19. The circuit of claim 18, and further comprising an error flag adapted to indicate whether the second fieldbus message had been completely received before the first fieldbus message was read from the receive first-in-first-out (FIFO) memory.

20. The circuit of claim 19, and further comprising a status flag adapted to indicate whether the end segment of the first fieldbus message had been read from the receive first-in-first-out (FIFO) memory and whether the second fieldbus message was already in the receive first-in-first-out (FIFO) memory.

21. A method of receiving at least portions of multiple fieldbus messages, comprising:
    serially receiving data representative of a first fieldbus message and at least a portion of a second fieldbus message;
    assembling data representative of the first fieldbus message into at least one first-message segment;
    storing the at least one first-message segment into a receive first-in-first-out (FIFO) memory;
    assembling data representative of the at least a portion of the second fieldbus message into at least one second-message segment; and
    storing the at least one second-message segment into the receive first-in-first-out (FIFO) memory while the at least one first-message segment is stored in the receive first-infirst-out (FIFO) memory.

22. The method of claim 21, and further comprising maintaining a count of a number of the at least one first-message segments stored in the receive first-in-first-out (FIFO) memory.

23. The method of claim 21, wherein the at least one first message segment comprises a plurality of segments.

24. The method of claim 21, and further comprising maintaining a pointer indicating a first segment of the at least one second message segment.

25. The method of claim 21, and further comprising maintaining a count of a total number of segments stored in the receive first-in-first-out (FIFO) memory.

26. A fieldbus computer program on computer readable media comprising:
    receive first-in-first-out storage instructions for receiving at least portions of two fieldbus messages and storing the at least portions in a receive first-in-first-out (FIFO) memory;

pointer instructions for storing information related to an end segment location if the at least one fieldbus message segment is an end segment;

counting instructions that maintain a count of a total number of message segments stored in the receive first-in-first-out (FIFO) memory; and reading instructions that iteratively read segments from incremental locations of the receive first-in-first-out (FIFO) memory based upon the number of segments stored in the receive first-in-first-out (FIFO) memory and the pointer information.

27. A fieldbus-device comprising:

means for receiving serial data corresponding to at least portions of two fieldbus messages from a fieldbus loop;

means for providing and storing data segments based upon the serial data; and means for reading the data segments.

* * * * *

UNITED STATES PATENT AND TRADEMARK OFFICE
CERTIFICATE OF CORRECTION

PATENT NO. : 6,564,268 B1
DATED : May 13, 2003
INVENTOR(S) : Davis et al.

It is certified that error appears in the above-identified patent and that said Letters Patent is hereby corrected as shown below:

<u>Title page,</u>
Item [57], ABSTRACT,
Line 10, after "adapted" delete ":".

<u>Column 9,</u>
Line 54, before "loop" delete ".".

<u>Column 10,</u>
Line 49, replace "infirst" with -- in-first --.

Signed and Sealed this

Twenty-second Day of July, 2003

JAMES E. ROGAN
*Director of the United States Patent and Trademark Office*